H. O. EWING.
COMPRESSING TOOL.
APPLICATION FILED SEPT. 13, 1916.
1,267,393.
Patented May 28, 1918.
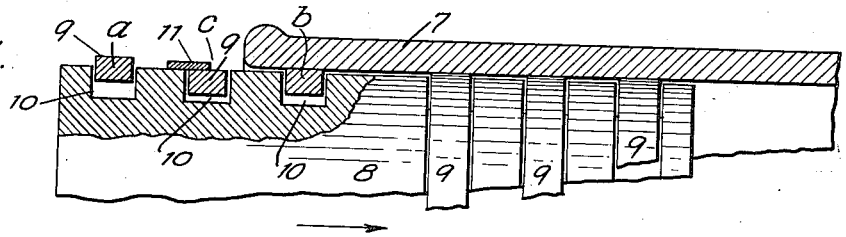
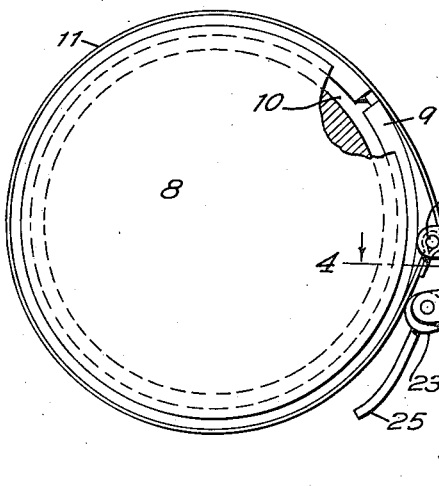
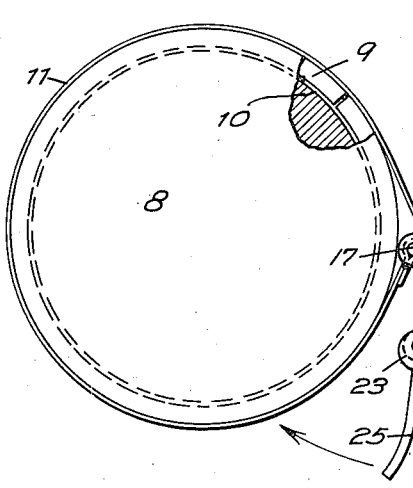
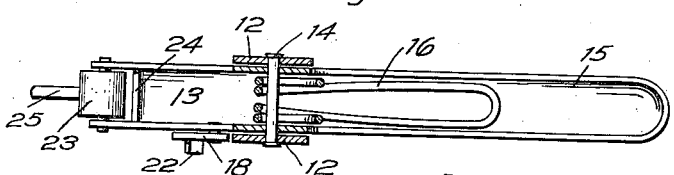
Inventor.
Herbert O. Ewing
By C. Spengel
Attorney.

UNITED STATES PATENT OFFICE.

HERBERT O. EWING, OF MIDDLEPORT, OHIO.

COMPRESSING-TOOL.

1,267,393.   Specification of Letters Patent.   Patented May 28, 1918.

Application filed September 13, 1916.  Serial No. 119,966.

*To all whom it may concern:*

Be it known that I, HERBERT O. EWING, residing at Middleport, Meigs county, State of Ohio, have invented a certain new and useful Compressing-Tool, of which the following is a clear, full, and exact description, attention being called to the drawing which accompanies this application and forms a part thereof.
Packing rings in pistons have a tendency to expand and insertion of a piston into its cylinder becomes difficult because the expanded rings are of a size which exceeds the diameter of the cylinder and form an obstruction to the insertion of the piston.

My invention concerns a tool constructed in a certain manner for the particular purpose of assisting the insertion of a piston with the packing rings thereon into its cylinder by serving to overcome the obstruction interposed by the packing rings while in exposed state. The tool acts by compression whereby the packing rings are contracted to a reduced diameter so that they do not project beyond the piston so that this latter may readily pass into its cylinder.

In the following specification and particularly pointed out in the claims at the end thereof is found a full description of my tool, its manner of use and its construction which latter is also illustrated in the accompanying drawing in which:

Figure 1. illustrates in a sectional view of parts of an engine cylinder and its piston why and how packing rings interfere with the placing of the piston into the cylinder and the manner in which this interference is overcome by my tool.

Fig. 2. shows the tool applied to the piston and arranged for use thereon.

Fig. 3. shows how the tool is used.

Fig. 4. is a horizontal section on line 4—4 of Fig. 2.

An extended use of the tool is found in connection with the cylinders of explosive engines which have to be cleaned quite frequently, which requires removal of the piston and re-insertion of the same.

In the drawing numeral 7 indicates part of such a cylinder and 8 shows part of the piston thereof.

Numeral 9 indicates packing rings seated in annular grooves 10 in the side of the piston. These rings are split or open and normally are larger in diameter than the inside of the cylinder, as shown at $a$ in Fig. 1, so that when the piston occupies its cylinder they impinge against the inner side of the cylinder wall as shown at $b$ in Fig. 1.

Obviously in their expanded state they form an impediment to the insertion of its piston into the cylinder.

To overcome this impediment I provide a flexible band 11, preferably a metallic tape, which is successsively looped around each of the various packing rings of the piston and so as to leave part of the engaged ring nearest the cylinder free as shown at $c$ in Fig. 1. The loop is now contracted so as to compress the engaged ring and to force it into its groove after which the piston is advanced into its cylinder until sufficient of the compressed ring has passed in and under the edge of the cylinder so as to be held thereby without the aid of the band, which may now be taken off.

The piston may then be readily advanced farther into the cylinder until the next packing ring stops further progress, after which the band is again applied.

For the purpose of reducing the loop formed by the band, I provide two levers 12 and 13, substantially alike and connected to each other by a pivot 14 as shown.

Both levers are extended beyond this pivot and shaped to form complementary sections 15—15 of a handle for gripping the tool.

A spring 16 is interposed to keep these handle sections normally apart so as to hold the levers at the other side of the pivot in position ready for action.

The band is connected to the free ends of these levers, it being permanently jointed at one of its ends to one of them by a pin 17. Its connection to the free end of the other lever is a temporary one and may be at any point between its ends. This connection is by means of a locking device carried at the free end of said lever.

In the application of the tool the band is positioned around the packing ring to be compressed and passed through an opening in lever 12 back of pin 17 whereby it is connected to said lever. Thereafter it is passed through a similar opening in lever 13 and drawn taut by pulling at its free end as indicated by the arrow in Fig. 2. Finally it is locked to lever 13, as shown in Fig. 3, after which the sections of the gripping handle are firmly grasped and pressed together as shown in the same figure, so as to cause the free ends of the levers to move apart. Additional pull is thereby applied to the looped part of the band, is circumferentially reduced, which action is transferred to the packing ring encircled by it whereby this ring is compressed in its grooves for the purpose described and as shown at c in Fig. 1.

The levers may be held in this position until the piston is advanced into the cylinder, by a pawl 18 on one lever which is placed in engagement with one of a number of notches 19 on the other.

A spring 21 maintains the engagement of this pawl with one of these notches and a button or turned-up lip 22 on it serves as a manipulating means for disengaging it therefrom.

A cam or eccentrically mounted roller 23 is used for locking band 11 to lever 13 and is supported in bearings provided for it at the free end of said lever. In positioning the band as before described it is passed through the space between this roller and a shoulder 24 and it is now locked by being clamped against this shoulder by means of roller 23, a handle 25 being provided for manipulation. This handle is so located and shaped that by swinging the gripped tool toward the piston, the free end of this handle may at the same time be pressed against the side of this piston thus increasing the pressure whereby roller 23 locks the band. Observe arrow in Fig. 3.

A lip 26 back of pin 17 serves as a guide and facilitates passing in of the band when the same is positioned as before described.

The tool may be manufactured in any suitable manner as for instance its two main sections may be pressed out of sheet metal.

As will be observed the tool is capable of use on a large range of sizes by reason of the band which is free at one end and may be readily placed in position on pistons of various diameters.

Having described my invention, I claim as new:

1. In a piston ring compressing tool, pliers comprising a pair of jaws, and handles connected to said jaws to separate said jaws when said handles approach, a relatively wide and thin flexible band pivotally connected to one of said jaws, forming a loop and extending through said one of said jaws past its pivotal connection thereto and through the other one of said jaws, and gripping means on said other jaw where said band extends therethrough to grip said band as said jaws recede, substantially as and for the purposes set forth.

2. In a piston ring compressing tool, pliers comprising a pair of jaws, and handles connected to said jaws to separate said jaws when said handles approach, a relatively wide and thin flexible band pivotally connected to one of said jaws, forming a loop and extending through said one of said jaws past its pivotal connection thereto and through the other one of said jaws, a cam on this other jaw to grip said band where its passes therethrough, and a handle fixed to said cam to engage with the surface adjacent to which said cam is brought and thereby cause said cam to grip said band.

In testimony whereof I hereunto affix my signature.

HERBERT O. EWING.